INVENTOR.
Howard J. Murray

Patented Feb. 6, 1945

2,368,865

UNITED STATES PATENT OFFICE 2,368,865

COMBINED FLUID DRIVE AND AUTOMATIC SELECTIVE SPEED POWER TRANSMISSION MECHANISM

Howard J. Murray, New York, N. Y.

Application December 27, 1941, Serial No. 424,644

27 Claims. (Cl. 74—189.5)

The present invention relates in general to an automatic speed-torque converting power transmission mechanism, and specifically relates to a device for effecting a plurality of positive speed drive relations between driving and driven members of a power transmission.

One of the objects of the present invention is to provide a simple form of mechanism including elements of planetary gearing arranged to derive control power from the driving member differentially through a positive path and a slip-drive path, and thence employ a portion of the said derived power to selectively brake certain elements of the said gearing stationary and thereby selectively effect a plurality of positive speed-drive relations between the driving and driven members.

A further object of the present invention is to provide a combination of means including a slip-drive couple, elements of gearing and selectively actuated element braking means wherein the holding means selectively brake certain elements of the said gearing stationary thereby to effect a predetermined positive speed-drive relation between the said elements and the said couple according to the extent and variation of the load torque on certain of the said elements.

An additional object of the present invention is to employ elements of planetary gearing and fluid drive coupling in a differential torque responsive manner whereby certain elements of the said gearing will be unidirectionally retarded in a selective manner by braking elements in accordance with the extent of the variation in the load torque on a driven member of the gearing.

A still further object of the present invention is to provide a combination of means including drive and driven members, elements of planetary gearing, a slip-drive coupling and a selective holding organization including braking portions selectively actuated by the said elements of gearing into braking position to selectively hold certain of the said elements stationary during certain variations in the load torque impressed on the driven member.

A still additional object of the present invention is to provide a plurality of selectively actuated drive control portions arranged to be operatively actuated in accordance with the magnitude and degree of variation of the torque load impressed on the driven member of a power transmission.

The invention also contemplates the use of a plurality of selectively actuated fluid pumps and associated valve mechanism to hold certain elements of planetary gearing stationary as other gearing elements are retarded and to release same so as to effect a plurality of selective positive speed-drive relations between driving and driven members.

The present invention is a further development of the disclosure included in my U. S. Patent application Serial No. 353,441 filed August 21, 1941, and my U. S. Patent application Serial No. 367,944 filed November 30, 1940.

While the present invention is obviously capable of use in any location wherein it is desired to transmit power from one member to another at automatically effected selective positive speed-drive relations, the present invention is particularly applicable to power transmissions for use in connection with automotive vehicle construction, and it is in this connection that embodiments of the present invention will be described in detail.

Accordingly the present disclosure includes automatic torque converting means for selectively effecting slip and non-slip drive relations between drive and driven members of a power transmission.

In one embodiment of the present invention the fluid coupling and elements of gearing are normally in differential slip-drive relation between drive and driven members, and element holding means are arranged so as to cause the said holding means be actuated by certain elements of the gearing whereby the said normal slip-drive relation will be superseded by certain positive speed-drive relations. In another embodiment the said normal slip-driven relation will be superseded by positive speed-drive relations effected by fluid holding means.

In the drawings.

While the physical parts of the mechanisms for carrying out embodiments of the present disclosure will be identified by specific names for convenience of expression, they are intended to be as generic in their application to similar parts as the art will permit.

Figures 1, 2, 3, 4, 5, 6, 7:
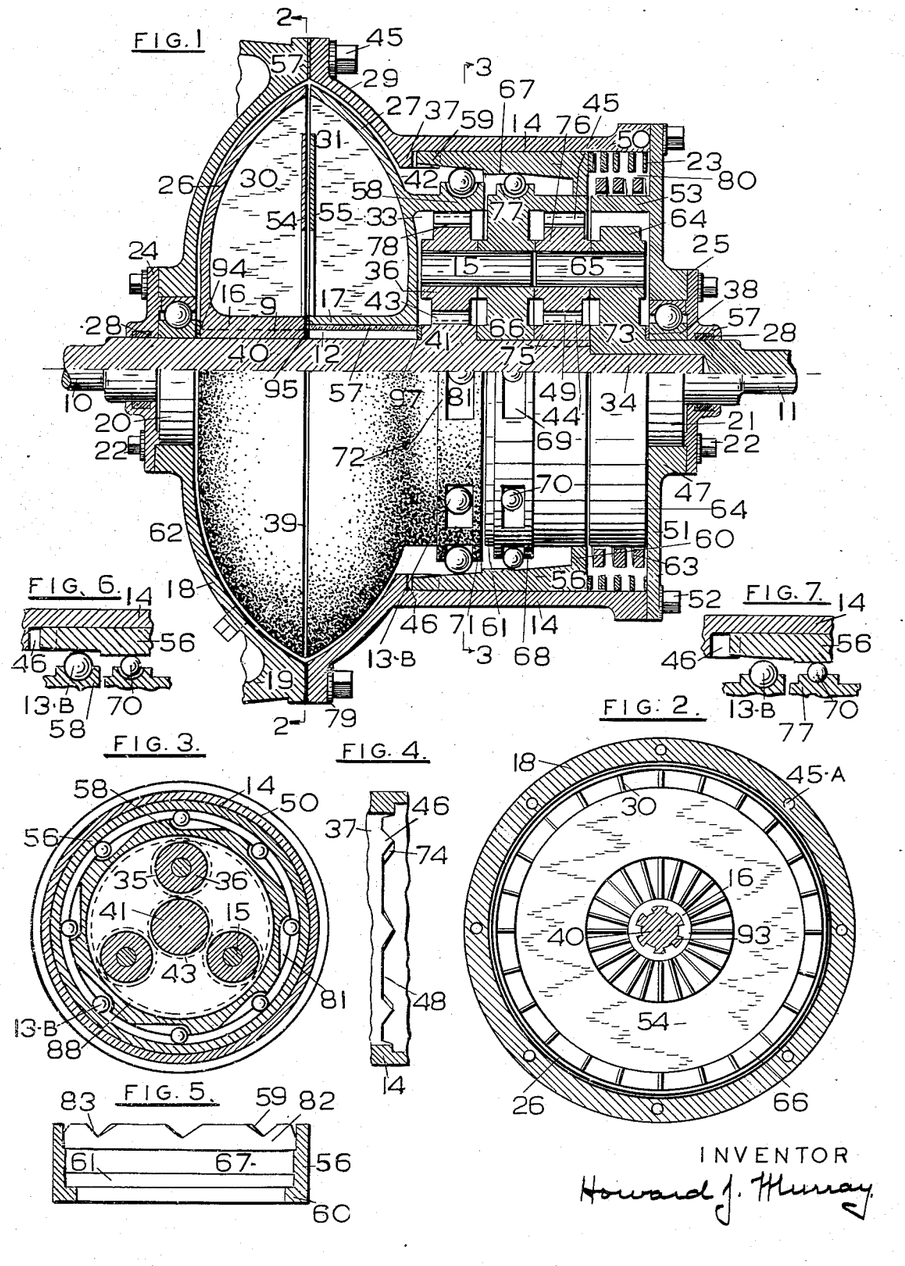
Figure 1 is an embodiment of the present invention partly in vertical section taken axially of the main shaft.
Figure 2 is a transverse sectional view taken upon the line 2—2 of Figure 1 looking in the direction indicated by the arrows.
Figure 3 is a transverse sectional view taken upon the line 3—3 of Figure 1 looking in the direction indicated by the arrows.
Figure 4 is a partial sectional view in elevation taken along the main shaft showing the stationary portion of the camming means.
Figure 5 is a partial sectional view in elevation taken along the main shaft showing the axially and rotary movable portion of the camming means.
Figure 6 is a partial sectional view of the selectively actuated braking means in braking position for a selected positive speed-drive relation between the driving and driven members.
Figure 7 is a partial sectional view of the means of Figure 6 showing the braking means actuated to effect another selected positive speed-drive relation.

There is shown by means of Figure 1 of the drawings a novel slip-drive coupling and associated power transmission elements normally constituting a slip-drive mechanism, and an associated drive control mechanism for automatically causing the said transmission to become a positive speed transmission. A pair of power shafts 10 and 11 are disposed in axial alignment with their adjacent ends including the reduced portion 34 of the shaft 10 interfitted so as to provide proper bearing surface.

The said power shafts 10 and 11 are mounted for independent rotary movement respectfully in suitable bearings 20 and 21 supported in the casings 18 and 29. While either of these power shafts may be considered as the normal driving member of the mechanism, for the purpose of this description, it will be considered that the shaft 10 is the normal driving member, and is operatively connected so as to be driven from a source of power (not shown) such as an internal combustion engine.

Accordingly the shafts 10 and 11 are drive related normally so that the shaft 11 is the driven member, and is operatively connected to whatever mechanism (not shown) it is desired to drive.

The shafts 10 and 11 are preferably made of a good quality of steel. The shaft 10 is formed with the sun teeth 43 at the radially extending portion 41, and the splines 9 and 12 at the portion 40. The shaft 11 is formed with the radially extending portions 73. The sun teeth 43 are formed so as to operatively receive the planet teeth 35 of a number of planet gears 36 (see Figure 3) mounted on the bearing 15 symmetrically positioned about the axis of the shaft 10. The bearings 15 are securely held by the freely mounted supporting member 66 formed for rotation about the axis of the shaft 10.

A slip-drive couple element 26 is splined at the portion 16 so as to be mounted on the mating splines 9 so that the impeller member 26 will be axially supported on the member 10 for rotation therewith. A second slip-drive couple element 27 is freely mounted on the bearing member 17 formed with splines to mate with the splines 12 formed on the member 10. The runner element 27 is formed with an axially extending portion 58 provided with annular teeth 88 (see Fig. 3) constantly in mesh with the planet teeth 35 in turn constantly in mesh drive relation with the sun teeth 43. The impeller member 26 is provided with the radially extending vanes 30 (see Fig. 2) and the runner member 27 is provided with the vanes 31. The ring members 54 and 55 are securely fastened to the vanes 30 and 31 so that the ring member 54 will rotate with the vanes 30 and the ring 55 will rotate with the vanes 31.

The freely mounted member 66 is formed at the portion 77 with an axially extending portion provided with the annular teeth 45 constantly in mesh drive relation with a second set of planet gears 76 provided with planet teeth 49 in turn constantly in mesh drive relation with a second set of sun teeth formed on the gear element 75 keyed to the shaft 10. The planet gears 76 are freely mounted for rotation on the shafts 65 securely positioned in the radially extending portion 73 of the normally driven member 11.

This gear element arrangement may be described as constituting a plurality of planetary speed-drive sets in cascade relation. The slip-drive couple as shown in Figure 1 is in effect a fluid drive coupling including a segmental impeller couple element 26 mounted for rotation with the member 10 and a segmental runner element freely mounted on the member 10. The vanes of the coupling elements may be attached to the said elements by any suitable known method such as by welding or brazing.

The member 27 is also formed with slots 81 to receive a plurality of brake rollers 13—B. The portion 77 of the member 66 is also formed with the slots 69 to receive the brake rollers 70. In the present disclosure, let it be assumed for the purpose of this description that the rollers 13—B and 70 are unidirectional braking means.

The casing portion 18 is formed with a bell portion 19 for attaching same to the vehicle upon which the device is to be installed and operated. The portion 57 of the said casing 18 is formed with threaded openings 45—A (see Figure 2) to receive the bolts 45 provided with the washers 79. The mating casing 29 is formed with the axially extending flanged portion 14 in turn formed with the cams 46 (see Fig. 4) having cammed surfaces 74. The casing 29 also includes the enlarged end portion 50 tapped and threaded to receive the bolts 52 for securing the enclosing end member 51.

A member 56 is formed to rotatably fit in the portion 14 of the casing 29. Cams 59 with surfaces 83 are cut in the member 56 (see Figure 5) so as to give the said member 56 a limited degree of axial and rotary movement relative to the cause 46 of the casing portion 14. Two springs 23 and 63 are in position between the enclosing member 51 and the cammed member 56. Spring 23 normally is in touch with the member 56 to seat the cams 59, and the spring 63 is axially shorter and stronger and does not normally touch the member 56 until it has been axially moved to the right a given distance as hereinafter described. The spring 63 is supported and positioned by the axial projection 53 formed from the member 51.

The end member 24 is formed to receive the oil retaining material 28 and is attached to the bell casing 18 by means of the bolts 22. The end member 25 is also formed to receive the oil retaining material 28 and is attached to the end enclosing member 51 by means of the bolts 22. The washers 38, 28, 95 and 97 are positioned between the members of Figure 1 as shown so as to keep the said members in proper operative relation.

Figure 8:
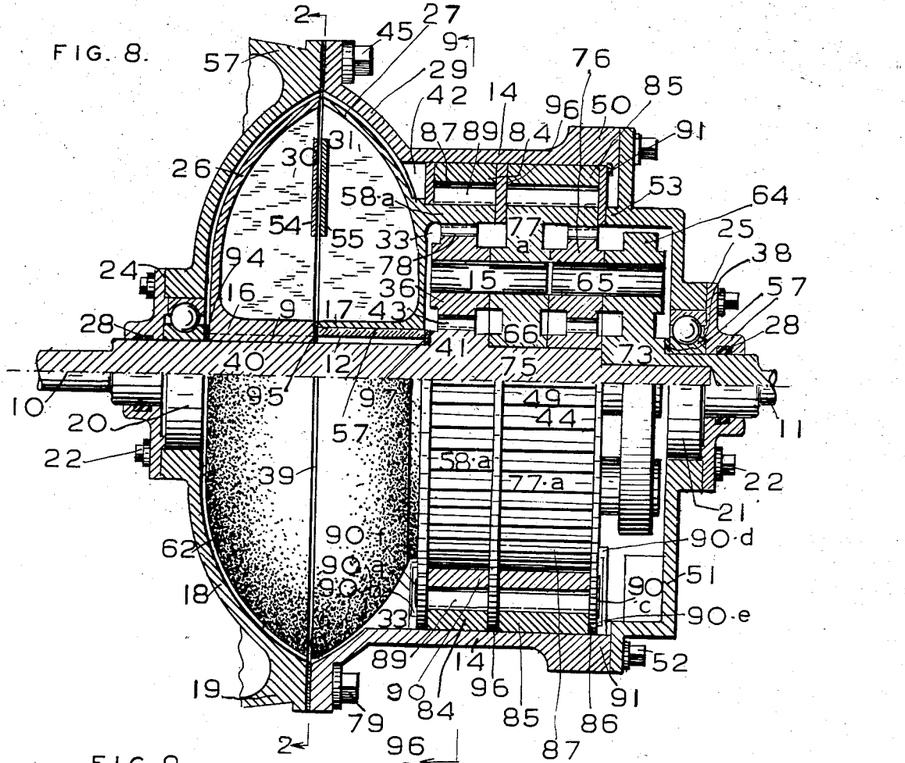
Fig. 8 is a showing of modification of the means of Figure 1 in which fluid drive control means are selectively actuated instead of rollers.

By means of Figure 8 there is shown a modification of the means of Figure 1. Fluid holding means are employed in place of the roller brake means of Figure 1. Member 58 of Figure 1 is modified so as to become member 58—a of Figure 8 to include the conventional oil pump teeth 87 in place of the portions 71, 72 and 81 of Figure 1. In the same manner the member portion 77 of Figure 1 is modified so as to include the oil pump teeth 77—a in place of the portions 44, 61 and 68. The members including the cammed portion 56, and springs 23 and 63 of Figure 1 are replaced by the toothed portions 84 and 85 of Figure 8. The pump sets 58—a and 84 and 77—a and 85 are operatively separated by the washer 96 and each pump is provided with fluid openings 92 and a fluid valve 90 as hereinafter described.

In assembly, the cammed member 56 and the springs 23 and 63 are operatively positioned in one modification by securing the member 51 to the casing portion 14 by means of the bolts 52. The members 66, 36, 75, 76 and 11 are then assembled on the member 10. The washer 38 and the bearing 21 is positioned and moved into place and the end member 25 attached to the enclosing member 51. The washer 97 and the splined bearing 57 are then installed to receive the runner member 27 by moving the shaft 11 until the annular teeth of the portion 58 are in mesh drive relation with the planet teeth 35 of the planet gears 36. The spacing washer 95 is then installed and the impeller member 26 moved to its axial position on the splines 93 of the member 10 (see Figure 2). The washer 94 and the bearing 20 are then installed and the casing 18 secured to the casing 29 by means of the bolts 45, after the end piece 24 is secured to the casing 18 by means of the bolts 22. It will be understood there are other ways of assembling the means of Figure 1 according to the manner of and the purpose for which the device will be installed and operated by those skilled in the art. In any event, the device may be attached to the vehicle upon which it is to be installed and operated by means of the bell portion 19 by conventional means (not shown) such as bolts.

The conventional clutch may be placed between the source of power and the member 10 if desired, although it is possible according to the present disclosure to directly connect the member 10 to the said source of power.

Let it be assumed for the purpose of this description, that the said source of power when connected to the said member 10 will rotate the said member clockwise as viewed from the left hand end of the means of Figure 1. The device to be driven, such as an automotive vehicle, is assumed to be connected to the normally driven member 11 through a conventional reversing unit (not shown) and that the member 11 is normally driven in the same direction as the said member 10.

The fluid retaining enclosure formed by the transmission casings 18, 29, 14 and 51 and the end members 24 and 25 is assumed to be fluid tight by means of conventional gaskets (not shown) and well filled with a suitable fluid drive medium.

The roller brake elements are assumed to be assembled on the member portions 58 and 77 before the general assembly. The sets 13—B and 70 may be held by conventional retainers so as to be moved on to the portions 58 and 77 as complete sets. In this event the portions 68 and 71 would be modified to include conventional portions to constitute press fit rings.

With the normally driven member 10 rotating clockwise at constant speed (constant speed assumed for the purpose of this description, altho it is obvious that the speed of the member 10 will vary in the manner of and the purpose for which the device is installed and operated) with the said reversing unit in position to move the said vehicle forward along its path. Let it be further assumed that the said conventional clutch is "in" and that a very slight torque load is impressed on the normally driven member 11.

All the rotatable members 10, 11, 26, 27, 66, 36 and 76 of Figure 1 will rotate at the same approximate clock-wise speed about the common axis of the members 10 and 11. With a theoretically zero load torque impressed on the member 11 all the said rotatable members would rotate integral at the same speed about the said common axis. Actually due to certain losses by friction and in the fluid the speed of the member 11 will be slightly less than the speed of the member 10. A slight difference in clockwise speed will take place between the elements of the slip-drive coupling and between the sun, planet and annular gears of the planetary gearing. A slight fluid drive action will be initiated between the impeller element 26 and the runner element 27. The power for this fluid drive action will be derived from the normally driving member 10.

As the impressed load torque on the member 11 is now increased, the said fluid drive action between the elements 26 and 27 will increase. The clockwise speed of the runner element 27 will thus decrease relative to the clockwise speed of the member 10. The clockwise speed of the annular gears 58 forming a portion of the element 27 (see Figure 3) will also decrease, but the clock-wise speed of the annular teeth 45 will decrease slower than the clockwise speed of the annular teeth 88 in order to maintain the proper planetary speed relations of the elements of the planetary gearing as shown by Figure 1, and the clockwise speed of the member 11 will also decrease in accordance with the differential speed relations of the said gearing elements.

Under normal driving conditions (with the speed of the member 10 still constant) the clockwise speed of the runner element 27 will decrease with increase of impressed torque load on the member 11. The fluid drive action between the couple elements 26 and 27 will increase, and the clockwise speed of the annular teeth 88 will continue to decrease faster than the clockwise speed of the annular teeth 45. Eventually the annular teeth 88 will decrease in speed to a state of rest or zero speed. The annular teeth 45 will still be rotating clockwise as the annular teeth 88 reach zero speed with the runner element 27.

It is obvious that the sets of roller clutches 13—B and 70 of Figure 1 may be operated as bi-directional or unidirectional brakes according to the form of the roller slots 69 and 81. Let it be assumed that the slots 81 are so formed as to cause the rollers 88 to act as unidirectional brakes as the portion 58 of the runner element 27 now rotates or tends to rotate counter-clockwise relative to the cammed member 56.

With still further increase of impressed load torque on the member 11, the runner 27 and thus the annular teeth 88 will start from rest to rotate counter-clockwise and thus the roller brakes 13—B will be moved into clutching engagement between the member portion 58 and the tapered surface of the cammed member 56 to hold the portion 58 and thus the runner 27 stationary for a given impressed torque load, and the members 10 and 11 will be in positive speed-drive relation as determined by the elements of the planetary gearing of Fig. 1.

During this gradual increase of impressed load torque on the member 11, the sets of sun teeth 43 and 44 have been rotating at constant speed. Thus, with the annular teeth 88 at rest, the planet gear teeth 35 will be rotated against the stationary annular teeth 88 to rotate the planet gears 36 on the bearings 15 thereby to rotate the freely mounted annular gear member 66 clockwise.

In this event the annular teeth 45 will be rotated clockwise, to aid the sun teeth 44 of the keyed sun gear member 75 to rotate and revolve the planet gears 76 on the bearing shafts 65 about the common axis of the members 10 and 11. Thus the portion 64 of the normally driven member 11 will be rotated slower clockwise as the torque load increases.

If the impressed torque on the normally driven member 11 does not further increase, the driving status of the means of Figure 1 will remain fixed because the speed of the member 10 is constant and the fluid driving action of the fluid coupling thus remains constant. Let it be assumed that the said impressed load torque on the member 11 to maintain this status is the lower limit of a torque load band hereinafter designated as the intermediate torque band. As long as this lower limit is maintained the cammed ring shaped member 56 will remain stationary against the compression of the spring 23 because of the predetermined balance of the connecting force resolving action of the means of Figure 1.

If the impressed torque is now further increased, the said connecting force resolving action of the means of Figure 1 will cause an increase in the tendency of the annular teeth 88 to rotate counter-clockwise against the clutching surface 82 of the cammed member 56 to move the member 56 axially and rotationally to the right against the spring 23. It is obvious that no relative movement will take place between the rollers 13—B and the said axially movable member as long as the said runner element 27 is stationary as the impeller element 26 rotates at the said assumed constant speed to transmit positive power through the shaft portions 40, 41 and 75 to the normally drive member 11, and at a speed-torque ratio determined by the said gearing.

However, with a change of impressed load torque, the runner member 27 will not remain stationary and the member 56 will be moved with two modes of motion by the camming action of the mating surfaces (see Figure 4) 46 and 48 against the said springs. The rollers 13—B will also move along the guides 81 as they rotate and revolve to follow a spiral path on the tapered inner brake surface of the said member 56. There will be no sliding motion of the balls on the said inner surface, because they can move with less friction on the said guides. The balls (or rollers) as shown by Figure 1 are actually ball bearings able to move in all directions as they move along the said guides without excessive friction, and at least with the friction encountered when constantly lubricated balls move along conventional guides. It is obvious that if any wedging action occurs at the point of contact between the rollers and the said braking surface of the member 56 the movement of the rollers in the guides will tend to increase, and this is true, because the greater force will prevail. Thus, the force from the driving member 10 to the sun teeth 43 and the annular teeth 88 and the rollers will be automatically employed to move the member 56 to a balancing position as the rollers follow the said spiral path.

As the impressed torque is varied the member 56 will be moved axially to the right or left. With sufficient increase in the impressed torque load, the member 56 will be moved to the right as the gearing element 77 is decelerated to zero speed. The rollers 13—B will have moved along the guides almost to their limited degree of movement. As the gearing member 77 now starts to rotate counter-clockwise, the rollers 70 will engage the member 56 at a greater torque force than the rollers 13—B because of the gearing arrangement and the member 56 will be moved still further to the right to move out of range of the rollers 13—B. The drive will thus be automatically transferred from the rollers 13—B to the rollers 70 as a function of the impressed load torque.

With further increases in torque load the counter-clockwise tendency of the roller brakes 13—B will increase to further rotate the member 56 counter-clockwise and move it axially to the right of Figure 1. Thus the torque balancing action of the drive control means of Figures 1, 3, 4, 5, 6 and 7 is operatively related to the torque load impressed on the driven member. The rollers 13—B and 70 automatically act as torque responsive over-running brakes when actuated to engage the rotatable and axially movable conical inner braking surfaces of the member 56. The friction between the mating surfaces 83 and 47 will be about the same as for similar cammed surfaces when properly designed with suitable material and constantly lubricated in the said fluid. The said surfaces will actually be immersed in this said fluid according to the present disclosure. This movement to the right will further compress the spring 23 which may be provided with a taper so as to increase its resistance against compression as the member 56 is moved to the right. Eventually the impressed torque on the member 11 will increase to the upper limit of the said assumed intermediate torque band. During this impressed torque increase between the limits of the said intermediate band the members 10 and 11 have been in the said positive intermediate speed-drive relation. As long as the impressed torque load varies within the said intermediate band limits, this positive intermediate speed-drive relation between the members 10 and 11 will be maintained. Thus, a hunting action of the drive control means of Figure 1 is automatically produced by the connecting force resolving action of the members 56, 23 and associated portions as hereinbefore described.

It should be noted at this time that two general paths are provided for the transmission of power by and between the members 10 and 11. Part of the said power will be transmitted by the fluid drive path including the fluid coupling elements 26 and 27, and the other part of the said power will be positively and mechanically transmitted by the shaft 10. The torque impressed by the runner element 27, one of the said paths, is employed to control the torque drive status of all the power (minus the losses) transmitted throughout all the said paths between the members 10 and 11.

Now let it be assumed that the torque load on the member 11 is increased beyond the upper intermediate band limit. The member 56 will be further rotated against the cam faces 83 and 74 (see Figs. 4 and 5) to move the said member 56 further to the right to further compress the spring 23. But the surface of portion 82 is tapered away from the axis of the member 10, and when the member 56 is moved sufficiently to the right, the roller brakes 13—B will no longer be held by the braking surface 82 of said member 56 (see Figure 7). In this event, the roller brakes 13—B will rotate counter-clockwise relative to the member 56. The rollers 13—B will act approximately as a thrust bearing with little opposition to the counter-clockwise rotation of the fluid drive element 27. The members 10 and 11 are automatically released from the said intermediate positive drive relation and a low speed band relation between the said members 10 and 11 will be automatically effected as a function of the torque load on the member 11.

As the torque on the member 11 is now further increased, the counter-clockwise speed of the runner element 27 will increase. It should be noted that the fluid drive action between the elements 26 and 27 is at maximum value as the element 27 is at rest because the greatest difference in speed occurs for this condition, and when the roller brakes 13—B are released by the said increase of load torque beyond the intermediate band, this fluid drive action between the elements 26 and 27 will less and less tend to cause the members 10 and 11 to approach the same speed in opposite directions. But, such tendency will be overcome by the greater force tending to rotate the said element 27 counter-clockwise because of the gear reaction due to the said increased torque load on the member 11.

With this further increase of the said torque load, the counter-clockwise speed of the element 27 will increase and the fluid drive action between the elements 26 and 27 will decrease. The clockwise speed of the roller brakes 70 will decrease along with the decrease in the speed of the member 11.

Eventually the clockwise speed of the annular teeth 45 will decrease to zero and thus be at rest. It is obvious that many different combinations of gearing may be employed to meet the peculiar requirements under which the devices of the present disclosure will be installed and operated. However, for the purpose of this description, let it be assumed that the roller brakes 70 will come to rest as the counter-clockwise speed of the element 27 equals the clockwise speed of the fluid drive element 26. In this event, there will now be no fluid drive action between the elements 26 and 27, and thus the fluid drive action of the mechanism is automatically eliminated as a function of the difference in speed of the members 10 and 11.

The rollers 13—B are rotating counter-clockwise with little or no opposition from the cammed member 56, but the cammed member 56 will be held to the position it has been axially moved to the right at the time the roller brakes 13—B are released to relatively move or rotate as a thrust bearing in effect to maintain the said member 56 against the reseating pressure of the spring 23 for this predetermined torque load.

As the said load torque is now still further increased, the member 66 and thus the roller brakes 70 will start to rotate counter-clockwise. This action will move the said rollers 70 into clutching relation with the portion 77 of the member 76 and the cammed member 56 to hold the annular teeth 45 stationary. The planet gears 36 (see Figure 3) will be rotated counter-clockwise by the sun teeth 43 as they are revolved about the axis of the member 10 to rotate the element 27 counter-clockwise at the clockwise constant speed of the member 10. There will be little fluid drive power lost in this operation as there will be no fluid drive action between the elements 26 and 27 as hereinbefore explained because the fluid pressures in the fluid paths of both elements will be equal. The fluid elements 26 and 27 and the sun teeth 43, planet teeth 35 and annular teeth 88 are in effect automatically eliminated from the mechanism (for this torque load) insofar as any driving relation between the members 10 and 11 is concerned.

With the annular teeth 45 at rest, the sun teeth 44 of the constant speed rotating gear 75 will rotate the planet gear teeth 49 against the still annular teeth 45 held stationary by the member 56. Such rotation will rotate the shaft 65 and thus the portion 64 forming a part of the normally driven member clockwise. This rotation will be positive at a ratio determined by the elements of the said planetary gearing. The positive speed-drive ratio when the rollers 70 are held stationary will not be the same as the speed-drive ratio between the members 10 and 11 as when the rollers 13—B are held stationary. Thus, the mechanism of Figure 1 automatically provides a fluid drive relation between the members 10 and 11 and thence in addition automatically effects a plurality of predetermined positive speed-drive relations between the driving and driven members 10 and 11.

As the torque load on the member 11 continues to increase, the counter-clockwise torque transmitted to the rollers 70 will also continue to increase, and the member 56 will again be moved against the said cammed surfaces to both rotate and move axially further to the right against both of the springs 23 and 63 to compress same. However, according to the present disclosure, the inner braking surface 67 of the member 56 is not tapered as is the surface 82 (see Fig. 5) so that the rollers 70 will not be released with increase of torque impressed on the member 11 as will occur in the case of the rollers 13—B. Thus a continued increase of torque will eventually act to stall the source of power rotating the member 10 because the said speed drive ratio will not change according to the said torque increase. The mechanism of Figure 1 is therefore self-limiting as to the possible speed-drive ratio between the members 10 and 11 when the member 10 is the driving member.

If the member 10 is now rotated at varying speed, any one of these speeds may be considered for a given instant as a constant speed and all of the operating relations as just described for the members, portions and elements of Figure 1 will occur as stated, but perhaps at different ratios.

If the impressed load torque on the member 11 is now a maximum for the operating conditions predetermined for the source of power, the member 56 will be moved to its extreme right axial position for maximum operating requirements. There will normally be space left for an emergency stalling movement, and there will also be emergency compression remaining in the springs 23 and 63 so as to eliminate any shock or jar.

If the impressed load on the member 11 is now decreased, the resultant torque effort of the portion 77 and thus the rollers 70 will correspondingly decrease and the springs 23 and 63 will combine to move the cammed member on the cams 59 and 74 to the left. The counter-clockwise speed of the fluid drive couple element 27 will not be appreciably affected except a slight variation due to the slight clockwise movement of the portion 77 as the member 56 moves slightly to the left.

With sufficient torque load decrease on the member 11, the resultant counter-clockwise torque on the roller brakes 70 will decrease to a zero value as the member 56 moves to the left from the position shown in Figure 7 to the position shown by Figure 6. The movement of the member 56 due to the varying counter-clockwise torque effort of the roller brakes 70 occurs during a low positive speed-drive relation between the members 10 and 11. The torque band impressed on the member 11 during the positive speed-drive control action of the rollers 70 will hereinafter be referred to as the low-speed torque band, and the members 10 and 11 will remain in positive low-speed relation as the impressed torque on the member 11 varies between the limits of this low speed band. Thus the drive control means of Figure 1 inherently possesses the ability to operate with a hunting action in effecting the selected positive drive relation between the members 10 and 11.

With further decrease of the load torque on the member 11 the portion 77 and the rollers 70 will start to rotate clockwise, and the rollers will be free to rotate clockwise relative to the member 56. The element 27 will decrease its counter-clockwise rotation as the rollers 13—B will act in effect as a thrust bearing to resist the said spring to prevent any further movement of the member 56 to the left for the given torque load on the member 11. Normally the roller brakes 13—B are free from the member 56 as long as the rollers 70 are held, and come into contact with the tapered surface 82 at approximately the time the rollers 70 leave the cylindrical surface 67. It is possible, however, to arrange the clutching surfaces 67 and 82 of the member 56 so that both sets of roller brakes 13—B and 70 may co-operate to hold the member 56 in a predetermined position for a given torque load on the member 11 by proper arrangement of the rollers, springs and the clutching surfaces.

As the torque load continues to decrease, the rollers 13—B and the element 27 will approach and reach a state of rest from their counter-clockwise rotation. During this approach the counter-clockwise torque decreased to the point where the member 56 could hold the 13—B rollers approximately stationary and thereby the element 27 approximately stationary. This torque point constitutes the upper intermediate speed-drive band limit as hereinbefore described. The rollers 13—B will continue to be held approximately stationary as the impressed load torque on the member 11 decreases through the intermediate torque load band.

When the lower intermediate band limit is reached the rollers 13—B will begin to rotate clockwise and the transmission mechanism of Figure 1 will be in a fluid slip-drive relation with the element 27 increasing in its clockwise rotation as the torque load on the member 11 is decreased.

It should be noted that these fluid and positive speed-drive relations between the members 10 and 11 are effected without shock or jar. This is true, because the portion 77 is at rest or nearly so as the rollers 70 are moved into braking position and out of same with the member 56. The same is true of the set of roller brakes 13—B. In addition the springs 23 and 63 are positioned to act as shock absorbers. The rollers may be moved into operative position and out of same with great mechanical advantage because of the relatively small taper angles of the surface 82 and 67. The size and number of the rollers and the form of the roller slots may be varied to meet the manner of and the purpose for which the mechanism will be installed and operated. In addition the cascade arrangement of the planetary elements of gearing may be amplified to include one or more sets of roller brakes so as to increase the number of positive speed-drive relations between the members 10 and 11.

The present disclosure is a further development of the inventions described in my copending U. S. applications Serial No. 353,441 filed Aug. 21, 1940, for "Automatic change speed power transmission mechanism" and No. 358,062 filed Sept. 24, 1940 for "Fluid drive mechanism," and the method of arranging elements of planetary gearing in cascade so that certain of the planetary elements will be held in accordance with the torque load on the driven member is taught in No. 353,441, but the holding action of the means of these disclosures depends on fluid action. According to one modification of the present disclosure roller brakes are selectively employed with greater efficiency than with the fluid means of No. 353,441. Roller clutches are employed in No. 385,062 without the hunting action inherent in the present mechanism.

When the normally driving member 10 becomes the driven member as it rotates clockwise as viewed from the left hand end of the means of Figure 1 with a relatively small load torque imposed on the now driven member 10, all of the rotatable mounted members of the mechanism of Figure 1 will tend to rotate at the same clockwise speed about the axis of the shaft 10. With increase of load resistance on the shaft 10, the member 11 and thus the portion 64 through the bearing shaft 65 and the planet gears 76 will tend to rotate the annular gears 45 to thus rotate the freely mounted member 66. The greater the load resistance of the member 10 and thereby the resistance of the sun gear 75 and the teeth 49, the greater the rotational torque impressed on the annular gear teeth 45 by the planet teeth 49. Thus rotational tendency will be transmitted to the shaft 15 and thus to the planet gears 36 and thereby to the annular teeth 88 to rotate the fluid drive element 27 clockwise. The relative clockwise speeds of the fluid drive element 27, shaft 10 and fluid drive element 26 will depend on the relative values of the elements of gearing, fluid medium and the fluid drive coupling elements. Let it be assumed for the purpose of this description, that the relation and details of the gearing and fluid elements is such that an increase of speed of the member 11 will cause the said gearing elements and the fluid drive elements to rotate the member 10 at a still greater increase of speed.

In general, and with the embodiment shown by Figure 1, such an assumption is consistent and in keeping with the connecting force resolving action of the fluid and gearing elements as hereinbefore described and in actual operation of the device. Thus the mechanism as shown by the means of Figure 1 is inherently self-limiting to the extent that the speed of the now driving member 11 will normally be limited, or the source of power driving the shaft 11 will have to be increased in order to appreciably increase its predetermined operating speed.

Stated differently, the speed of the member 10 will normally increase faster than the speed of the member 11.

The portions 58 and 77 are always rotated clockwise as the member 11 becomes the driving member, and because in the embodiment of Figure 1 the roller brakes 13—B and 70 are considered as unidirectional brakes they will not be operated during clock-wise rotation of the portions 58 and 77—a. The mechanism of Figure 1 is entirely automatic whether the power is being transmitted to either of the members 10 and 11.

Thus, according to the present disclosure, I provide a highly efficient combined fluid drive and selective positive speed-drive transmission mechanism. The mechanism automatically selects a positive-speed drive relation according to the load torque on the driven member 11, and automatically acts to limit the speed of the vehicle when running against compression.

Figure 9:
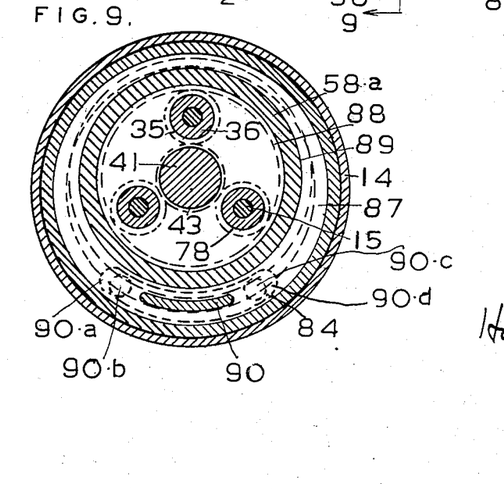
Figure 9 is a transverse sectional view taken upon the line 9—9 of Figure 8 looking in the direction indicated by the arrows.

By means of Figure 8 there is shown a modification of the means of Figure 1 in which no roller brakes are employed. The annular gear portions 58 and 77 of Figure 1 are modified to include the oil pump gears 87 and 89. The modified portion 58—a is a part of one pump known as the low speed pump, and the modified portion 77—a is a part of a second pump known as the intermediate pump. The portions 96 separate the pumps so that oil cannot flow from one to the other. Portions 84 and 85 constitute the outer gears of the said pumps. Thus toothed portions 84 and 58—a constitute the "low" pump, and portions 77—a and 85 constitute the "intermediate" pump. When the modification of the means of Figure 1 as shown by Figure 8 is employed the fluid coupling elements 26 and 27, the gearing elements and the members 10 and 11 may be similar. The difference between the two sets of means is found in the operation. Figure 1 includes clutch rollers held by the member 56 in turn to hold the gearing elements to mechanically effect speed drive relations between the members 10 and 11. Figure 8 includes fluid braking elements unidirectionally held by the opposition of fluid against compression. This opposition is caused by more or less conventional check valves actuated by portions of the said fluid. The unidirectional braking action of the selectively actuated fluid braking mechanisms will in turn be imparted to the certain gearing elements actuating same by power derived from the driving member. Thus the more or less conventional pump means 84, 87, 89, 58—a, is substituted for the annular gear 58, rollers 13—B, member 56, springs, cams of Figure 1 as an equivalent means of braking or holding the annular gear and thus, the runner element 27. Similar substitutions are made for the means including the rollers 70. Both sets of means (that of Figure 1 and of Figure 8) are automatically torque responsive to change from the low torque load slip-drive action of the fluid drive couple 26—27 to the positive speed-torque drive action of the gearing and the said holding means during high torque intervals as the member 27 is rotated counter-clockwise at the approximate speed of the clockwise rotating element 26. Figure 9 shows a section of the annular gear 58—a and the portions 88, 89, 87, 90—c, 90—d, 84, 90, 90—a, 90—b, 78 and 92 together constituting a fluid pump and associated openings and check valve. A duplicate set is shown in Figure 8 and may be identified in part by the numerals 77—a, 76, 96, 86, 87, 85, 49, 90—c, 90—e.

The oil valves would be set to cause the annular gears to be held approximately stationary until a predetermined oil pressure is created by an increase of load torque on the driven member 11 as described in the said U. S. application 353,441. When member 11 is driving the valves would be provided to operate at unidirectional pressures as explained in my said application 353,441. It is not believed that the teaching of the application 353,441 should be repeated. In general, the modification includes the pumps of Figure 6 and valve assembly of Figures 8 and 11-13 inclusive of application 353,441 in combination with the fluid drive elements and the gear elements of Figure 1 of the present disclosure. A pump fluid braking means of Figure 8 may be used with a roller brake mechanism means of Figure 1.

While I have shown and described and have pointed out in the annexed claims certain new and novel features of my invention, it will be understood that certain well known equivalents of the elements illustrated may be used, and that various other substitutions, omissions and changes in the form and details of the devices illustrated may be made by those skilled in the art without departing from the spirit of my invention.

For example, the elements of planetary gearing of Figure 1 may be increased so as to provide additional annular gears and thereby additional selective positive speed-torque drive relations between the members 10 and 11. If for any reason, the fluid medium of the coupling of Figure 1 is absent, the fluid coupling in operative effect will be removed. The planetary (58) portion of the runner element (27) would quickly decrease in clockwise speed to approach zero speed (or rest) with any appreciable load torque impressed on the member 11. This is true, because there would be no fluid drive clockwise torque from the said coupling (26—27) impressed on the portion (58). The torque transmitted by the constantly rotating sun teeth 43 will tend to rotate the planet gears 36 and therethrough the runner element 27 counter clockwise without opposition. With increase of load torque on the member 11, one annular gear after the other will pass through zero speed to be held and more or less released as hereinbefore described. (See fluid pump elements of Figure 8.) Each annular gear will be retarded or stopped during the variation of load torque between the limits of a selected load torque band in a hunting manner as also described hereinbefore.

Having thus described my invention, I claim:

1. In a device of the class described, the combination including drive and driven power rotors, differential speed drive sets and fluid drive coupling elements normally in differential fluid drive relation about a common axis, said driving rotor positively drive connected to one of the said coupling elements, said speed drive sets positively drive connected to the other said coupling and to both of the said rotors, and drive control braking means including a ring-shaped axially extending cammed portion, means for resiliently positioning the said cammed portion over a limited degree of rotary motion about the said common axis, stationary cammed portions and a plurality of sets of roller brakes carried by certain of the said differential speed sets and unidirectionally movable into and out of clutching relation with certain clutching surfaces of the said axially movable portion as a function of the direction of motion of the said certain speed sets.

2. In combination, driving and driven power members, elements of planetary gearing and fluid drive coupling in drive relation about a common axis, one element of the said coupling drive connected to the said driven member and the other coupling element drive connected to an element of the said gearing, elements of the said gearing drive connected to both of the said power members, and speed drive control means also mounted for rotation about the said axis and including a cammed axially extending cylindrical brake control member, springs, stationary cammed surfaces and sets of brake rollers carried by certain elements of the said gearing and provided with a limited degree of motion relative thereto, said sets arranged so as to be selected and actuated into and out of braking engagement with portions of the said axially extending member as an automatic function of the extent and direction of rotation of certain of the said gearing elements.

3. In a device of the class described, power rotors, elements of gearing and elements of fluid drive coupling in fluid slip-drive relation about a common axis, and torque responsive braking drive control means including groups of brake rollers carried by certain torque responsive elements of the said gearing and having a limited degree of movement relative thereto, co-operative stationary cammed portions, resilient elements and a cammed axially extending cylindrical member operatively associated with the said stationary cammed portions and said resilient elements so as to have a limited degree of axial and rotary movement relative thereto, said rollers operatively positioned so as to be moved into and out of clutching relation with the said axially extending member as a function of the directionally relative speeds of the said certain gearing elements.

4. In combination, drive and driven power members, speed drive gearing elements and a fluid drive coupling including segmental impeller and runner elements normally in differential fluid slip-drive relation about a common axis, said drive member positively drive connected to one of the said fluid coupling elements, said gearing elements positively drive connected to the other said fluid drive coupling and to both of the said power members, a ring-shaped drive control member, springs, and associated stationary cammed portions for normally positioning the said drive control member relative to the said stationary cammed portions and to the said springs, and still further drive control means constituting sets of brake rollers carried by certain of the said gearing elements and selectively movable as groups into and out of braking relation with certain portions of the said ring-shaped member as an automatic function of the load torque impressed on the said driven member.

5. In a device of the class described, the combination of a fluid tight casing, a pair of fluid tight bearings positioned in openings in the said casing, a pair of power members mounted for relative rotation in the said bearings and extending through the said bearings, speed-drive torque responsive elements of planetary gearing and a fluid drive coupling constituting impeller and runner elements, a fluid, said gearing elements, said coupling elements and a part of said power members submerged in said fluid within said casing and in fluid drive relation about a common axis, and a plurality of separately positioned braking means included a common ring-shaped axially extending cammed member substantially encircling the said gearing elements, operatively associated stationary cammed portions and springs for normally positioning the said ring-shaped member, and further braking means including a plurality of sets of roller brakes carried by certain of the said gearing elements, said sets of rollers positioned on the said certain gearing elements so as to be moved as sets into and out of braking engagement with portions of the said ring-shaped member by power derived from the said driving member to move the said ring-shaped member against the said springs and said cams with two modes of motion according to the load torque on the said driven member.

6. In combination, drive and driven power members, a fluid drive coupling comprising segmental impeller and runner elements and differential speed gearing elements normally in differential fluid drive relation, said drive member positively drive connected to the said impeller element, said gearing elements positively drive connected to the said runner elements and to both of the said power members, and further fluid drive couplings constituting fluid drive braking means separately mounted and each including fluid drive portions mounted for rotation with certain of the said gearing elements, associated stationary fluid drive elements and flow control valves arranged so as to be unidirectionally actuated by fluid energized by the said mounted fluid drive portions with power derived from the said driving member through the said gearing elements according to the directional rotation of the said gearing elements and therethrough the difference in speed of the said members.

7. In a device of the class described, drive and driven power members, torque responsive elements of gearing, torque responsive elements of fluid drive coupling and torque responsive drive control brake organizations immersed in a fluid and in slip-drive relation about a common axis, an element of the said coupling drive related to one of the power members and the other coupling element drive related to the said gearing elements, said gearing elements drive related to both of the said power members, said brake organizations including roller brakes carried by certain of the said gearing elements and normally movable relative thereto, a common ring-shaped member substantially encircling the said gearing elements, associated stationary cammed portions, and a plurality of springs for normally torque responsively positioning the said ring-shaped member relative to the said stationary cammed portions and the said roller brakes, said roller brakes selectively moved into and out of clutching relation with the said ring-shaped member according to the torque responsive direction of rotation of the said certain gearing element carrying the said roller brakes.

8. In combination, means constituting elements of cascaded planetary gearing, a pair of power rotors, a fluid, a fluid impeller couple element drive connected to one of the said rotors, a runner couple element drive connected to an element of the said gearing and therethrough to all the said gearing elements, certain elements of said gearing drive connected to both of the said rotors, a plurality of fluid pumps respectively drive connected to certain of the said gearing elements so that a portion of the said fluid will be actuated according to the individual extent and direction of rotation of the said certain gearing elements, and a plurality of check valves respectively associated with the said pumps and therefore actuated fluid to control the flow of same according to the said extent and direction of rotation of the said certain gearing elements.

9. In a fluid-mechanical drive control mechanism, the combination of means including a fluid, a pair of power rotors, planetary gearing, a fluid drive coupling, a plurality of fluid pumps and a plurality of check valves all operatively immersed in the said fluid, said coupling drive connected to the gearing and one of the rotors, said gearing drive connected to both of the rotors, each of said pumps separately drive connected to an element of the gearing and operatively associated with one of the said valves.

10. In a device of the class described, the combination including a casing, a fluid, a pair of power rotors extending through the walls of the said casing, a single couple of fluid drive elements, gearing elements in cascade drive arrangement, said rotors, said couple elements, and said gearing elements mounted in said fluid for differential rotation about a common axis, a plurality of fluid pumping means and respective valves arranged so as to be actuated according to the direction of flow of the fluid in the respectively associated pump to control the fluid pumping action of the same, said gearing drive connected to both of the said rotors, said fluid drive elements drive connected to the said gearing and one of the rotors, said pumping means respectively drive connected to certain elements of the said gearing, all of said movable means constantly immersed in the said fluid.

11. In a combined fluid drive and automatic selective speed power transmission mechanism, the combination of means including a fluid medium, a pair of power rotors, elements of gearing, elements of a fluid drive coupling and torque responsive brake means mounted substantially within an enclosure and submerged in the said fluid, said gearing elements differentially drive connected to both rotors so that certain of the said gearing elements will respectively change direction of rotation in accordance with a change in difference of speed of the said members, said gearing elements also drive connected to brake means and to said coupling, said coupling drive connected to one of the said rotors, the other element of the said brake means including brake control elements sequentially actuated as a function of the extent of change in direction of rotation of said certain elements of the said gearing.

12. In combination, power members, planetary gearing and a fluid coupling normally in slip-drive relation so that certain elements of the said gearing will respectively change direction of rotation according to the extent of change in speed difference of the said members, and brake mechanisms including brake control elements respectively drive connected to elements of the gearing and therethrough differentially drive connected to both of the said members and the said coupling, said control elements individually actuated as a function of the extent of individual change in direction of rotation of said respectively connected certain elements of the said gearing and thus the relative speeds of said elements of the said coupling.

13. In a device of the class described, the combination of means including a casing, a fluid medium, a pair of power members, elements of cascaded planetary gearing, elements of a fluid drive coupling and movable brake elements mounted substantially within said casing for relative movement in said medium and about a common axis so that certain elements of the said planetary gearing will be respectively reversed in direction of motion one after the other as a function of the difference in speed of the said couple elements, said gearing elements drive connected to both of the members, said coupling and to said brake elements, said coupling also drive connected to one of the members, and further brake elements including stationary portions each equipped with a check valve operatively associated with the said movable brake elements to be selectively actuated by brake energized portions of the said fluid so as to cause said movable elements to be individually and collectively unidirectionally actuated in accordance with the relative speed of the said coupling elements.

14. In combination, planetary gearing, fluid coupling including impeller and runner elements, a pair of power members and brake elements normally in clockwise slip-drive relation, certain elements of the said gearing drive connected to both of the said members and to the runner element and the said brake elements, said impeller drive connected to one of the said members, and further brake elements provided with a limited degree of movement relative to each other and to the said movable brake elements thereby to control the power transmitted by the said movable brake elements and thus retard same individually and collectively according to the direction of rotation of certain elements of the said planetary gearing.

15. In combination, power members, gearing and a fluid coupling, said gearing drive connected to both of the said power members, said coupling drive connected to one of the said members and the said gearing, said gearing including speed drive elements arranged so as to be respectively reversed in direction of rotation according to the extent of change in difference in speed of the said members, fluid pump mechanisms each drive connected to a different reversible gearing element, a fluid for the said combination, and valve means operatively associated with each of the said mechanisms by power derived from said connected reversible gearing elements through pump actuated portions of said fluid so as tend to selectively retard said gearing elements as a function of a difference in speed of the said power members individually and collectively.

16. In a device of the class described, the combination of a fluid, power members, planetary gearing and a fluid coupling normally in drive relation in and by said fluid, and a plurality of torque responsive fluid braking organization including pumping elements respectively drive related to certain elements of the said gearing in turn drive related to the said coupling and to both of the said members, one of the said members drive related to the said coupling, said gearing including certain speed drive elements arranged so as to tend to be varied as to the extent and direction of their rotation in accordance with a change in the difference in speed of the said members, said braking organizations each including a portion of said fluid and a stop valve for controlling the flow of said fluid portion when actuated by power derived from the said certain gearing element according to the individual extent and direction of rotation of the said certain element.

17. In an automatic speed drive control mechanism, the combination of means including a fluid, a pair of power members, speed drive elements collectively constituting cascaded planetary gearing and a fluid drive coupling surrounded by the said fluid and in drive relation about a common axis, said gearing drive connected to both of the said members and the said coupling, said coupling drive connected to one of the said members, unidirectional braking means formed with a stationary cammed portion, a common axially extending cammed portion substantially encircling the said gearing and a plurality of springs, said axially extending portion normally positioned so as to have a limited degree of rotary and axially relative movement against said springs and said cammed portion, and a plurality of sets of roller brakes mounted for rotation on certain of the said gearing elements and having a limited degree of movement relative thereto so as to be selectively moved into and out of braking relation with the said axially extending portion by means of power derived from the driving member so that the said gearing elements will be retarded and finally stopped by the braking action between the said certain set of roller brakes and the said axially extending portion and rotated in the relatively opposite direction and retarded to a greater degree by the additional braking relation between another set of roller brakes and the said portion, said retarding action occurring as an automatic function of the difference in speed of the said members.

18. In a device of the class described, the combination of means including a fluid, power members, planetary gearing and fluid coupling in differential drive relation in said fluid, said gearing positively drive connected to both of the said members and to an element of the said coupling, said gearing including elements operatively arranged so that certain of the said elements will be sequentially reversed in direction of rotation according to the variation of the said differential relation, said other coupling element drive connected to one of the said members, and a plurality of fluid brake organizations respectively and constantly drive related to said certain elements of the said gearing, said organizations including pumping elements and check valves operatively associated with portions of the said fluid brake actuated so as to be unidirectionally torque responsive to the load on the said driven member for a given speed of the driving member thereby to control the unidirectional braking action of the said respective braking organizations and therethrough the universal fluid driven action of the said fluid coupling.

19. In a combination slip-drive and positive drive power transmission mechanism including a pair of power members, elements of planetary gearing and a fluid coupling including an impeller element and a runner element, said gearing drive connected to both of the said members and to the said runner element, said impeller element drive connected to one of the members and fluid drive related to the said runner element, a plurality of fluid pumping mechanisms respectively drive connected to certain of the said gearing elements, fluid for the said coupling and said pumping mechanisms, and check valves for each of the said pumping mechanisms.

20. In a device of the class described, the combination including a fluid medium, a driving member and a driven member, elements of a fluid coupling, sun, planet and annular elements of planetary gearing and a plurality of fluid braking means respectively drive related to the said annular elements, said driving member connected to an element of the said fluid coupling and to one of the said sun elements, said driven member drive connected to a certain one of the said planet elements, said other fluid coupling element drive related to one of the said annular elements each of said braking means including elements of a gear pump and an associated check valve, said check valve selectively actuated according to the directional pumping action of the pump in turn arranged so as to be actuated according to the extent and direction of rotation of the said associated annular element.

21. In a device of the class described, the combination including a fluid, a pair of power members, elements of a fluid coupling, elements of planetary gearing and unidirectionally controlled braking mechanisms normally in slip-drive differential relation when operatively submerged in the said fluid, said gearing drive connected to both of the said members and to one of the fluid coupling elements, the other of the said fluid coupling elements drive connected to one of the members, said braking mechanisms each including a stationary portion, a check valve positioned thereon and a fluid pumping portion respectively drive connected to an element of the said gearing, said pumping portions and associated fluid and thereby said valves respectively actuated by power derived from one of the said power members according to the extent and direction of rotation of the respectively associated gearing element.

22. In a device of the class described, the combination including a pair of power members, gearing elements and a fluid drive coupling in drive relation said gearing elements drive connected to both of the said members and to an element of the said coupling so that certain members of the said gearing will respectively change the direction and extent of rotation as a function of the fluid drive relations of the coupling elements, the other element of the coupling drive connected to one of the members, and a plurality of self-limiting fluid brake means respectively drive connected to the said certain elements of the said gearing and formed with fluid flow control portions for unidirectionally causing the said brake means to individually and collectively derive braking power from one of the said members thereby to tend to limit a change in direction of rotation of said certain gearing elements and therewith a change in the fluid drive action of the said coupling elements in accordance with the difference in speed of the said members.

23. In a device of the class described, the combination including a fluid, a driving member, a driven member, a fluid coupling formed with an impeller element and a runner element, elements of planetary gearing and self-energizing braking means each brake means including a unidirectional fluid pumping organization, and further means for drive relating the said gearing and brake means so that the said braking means will be respectively energized by certain of the gearing elements to individually and collectively tend to unidirectionally hold and rotate the said runner according to the extent and direction of their rotation, said further means also including a gear element for drive relating elements of the said gearing to the said runner so as to normally decrease the said runner speed upon an initial increase in the load on the said driven member and thus a connecting force resolving action on certain of the said braking means, a further increase of said load reacting on said gearing and said braking means to cause a still further decrease in speed and finally a reverse in the direction of rotation of the said runner, and a still further increase in said load reacting on the said braking means to cause the said reverse rotation speed of the said runner to approach a relatively reverse speed approximately equal to the opposite speed of the said impeller to approximately neutralize the fluid drive action of the said coupling thereby to operatively eliminate the said fluid coupling drive action between the said members as only the positive power transmission action continues.

24. In a power transmission mechanism including a pair of power members, a fluid, a fluid coupling, torque responsive gearing elements and fluid brakes, and means for differentially and normally slip-drive relating said members, said coupling, said gearing and brakes in the said fluid so as to actuate said brakes by said gearing, said brakes arranged so as to tend to automatically resist said actuation according to the extent and direction of same to control said gearing in its connecting force resolving drive relation with said coupling to universally fluid drive relate the elements of said coupling and thus the said slip-drive action between the members to be micromatically superseded by a positive drive action as a function of the change in speed difference of the said members.

25. In a device of the class described, the combination including a fluid, an approximately constant speed driving member, a driven member, a fluid coupling, elements of gearing and fluid brake mechanisms each including fluid pumping portions and an operatively associated check valve, and drive relating means for universally fluid drive relating the said means in the said fluid so that the said brake mechanism will unidirectionally derive braking power from certain elements of the gearing according to the extent and direction of their individual torque responsive rotation to yieldably control same to effect universal fluid drive relation between elements of the said coupling thereby to further effect speed drive relations between the said members in accordance with the load on one of the said members.

26. In a combination fluid and positive drive power transmission device, the combination including a pair of power members, a slip-drive coupling, gearing, a fluid and braking mechanism, and drive connecting means for drive relating the said means so as to vary the difference in speed of the said members in accordance with the universal slip-drive action of the said coupling, said gearing arranged so that certain of its elements will respectively reverse according to the extent and direction of speed change of the members in turn to respectively actuate the said braking means according to the extent and direction of said reverse, said universal slip-drive retarding action resulting from the action of the said braking means on the said gearing.

27. In a device of the class described, a pair of power members, elements of gearing, a slip-drive coupling and a plurality of unidirectional retarding mechanisms, said gearing elements drive connected to both members, an element of the said coupling and respectively drive related to the mechanisms, the other member drive connected to an element of the gearing, said members, said coupling elements and said gearing arranged so as to be normally in slip-drive differential relation, said mechanisms energized by power derived from the said respective gearing elements to tend to retard said respective elements according to the extent and direction of their rotation.

HOWARD J. MURRAY.